United States Patent
Schmalstieg et al.

(10) Patent No.: US 10,504,280 B2
(45) Date of Patent: Dec. 10, 2019

(54) ACCELERATED OCCLUSION COMPUTATION

(71) Applicant: QUALCOMM Incorporated, San Diego, CA (US)

(72) Inventors: Dieter Schmalstieg, San Diego, CA (US); Markus Steinberger, Graz (AT); Philip Voglreiter, Graz (AT)

(73) Assignee: QUALCOMM Incorporated, San Diego, CA (US)

(*) Notice: Subject to any disclaimer, the term of this patent is extended or adjusted under 35 U.S.C. 154(b) by 53 days.

(21) Appl. No.: 15/867,401

(22) Filed: Jan. 10, 2018

(65) Prior Publication Data
US 2019/0213784 A1    Jul. 11, 2019

(51) Int. Cl.
*G06T 15/40* (2011.01)
*G06T 15/30* (2011.01)
*G06T 15/00* (2011.01)
*G06T 15/20* (2011.01)

(52) U.S. Cl.
CPC .......... *G06T 15/405* (2013.01); *G06T 15/005* (2013.01); *G06T 15/20* (2013.01); *G06T 15/30* (2013.01); *G06T 15/40* (2013.01)

(58) Field of Classification Search
CPC ..... G06T 15/405; G06T 15/005; G06T 15/20; G06T 15/30
See application file for complete search history.

(56) References Cited

U.S. PATENT DOCUMENTS

| | | | |
|---|---|---|---|
| 2006/0164414 A1 | 7/2006 | Farinelli et al. | |
| 2012/0229445 A1* | 9/2012 | Jenkins | G06T 15/60 345/418 |
| 2013/0215115 A1* | 8/2013 | Jenkins | G06T 15/20 345/420 |
| 2013/0265309 A1* | 10/2013 | Goel | G06T 15/80 345/426 |

(Continued)

OTHER PUBLICATIONS

Decoret X., et al., "Erosion Based Visibility Preprocessing", Eurographics Symposium on Rendering, 2003, XP002789424, pp. 281-288, Retrieved from the Internet: URL: http://www.cs.upc.edu/teaching/Master/Visibility/session2/erosionBased.pdf [Retrieved on Mar. 4, 2019].

(Continued)

*Primary Examiner* — Yu Chen
(74) *Attorney, Agent, or Firm* — Campbell C. Chiang

(57) ABSTRACT

A system utilizing specified occlusion techniques to reduce the overall amount of occlusion computations required to generate an image in a changing viewpoint environment. Viewpoint location changes about a current viewpoint can result in a different image view with the potential exposure of previously occluded portions of a scene image that would now be now visible from that new viewpoint location. To reduce the amount of occlusion computations required to render an associated image in a changing viewpoint environment, techniques are described that reduce occlusion computations using, for example, one or more trim region rendering techniques. Some techniques include generating potential visible set (PVS) information based on a viewport including an original viewpoint location and an anticipated change in viewpoint location.

41 Claims, 10 Drawing Sheets

(56) References Cited

U.S. PATENT DOCUMENTS

2015/0269770 A1* 9/2015 Jenkins .................. G06T 15/20
345/421

OTHER PUBLICATIONS

International Search Report and Written Opinion—PCT/US2018/064712—ISA/EPO—dated Mar. 15, 2019.
Rong-Hua Z., et al., "An Efficient Real-Time Terrain Rendering Algorithm", Energy Procedia, vol. 13, 2011; XP028470354, ISSN: 1876-6102, DOI:10.1016/J.EGYPRO.2011.12.564, pp. 8120-8127, [Retrieved on Mar. 15, 2012].

* cited by examiner

Example

City scene

Color-coded linked list depth (shown in grayscale)

ACCELERATED OCCLUSION COMPUTATION

BACKGROUND

Field

The disclosure relates to processing of image information and, more particularly, to the preparation and processing of image information to be outputted for display on a user display.

Background

Many techniques for generating images, including both those which run off-line on static scenes, and those on-line with dynamic scenes, can benefit from the use of techniques of occlusion culling using occlusion computations, to minimize the processing required to render a scene, and to otherwise minimize the time required to render a full scene image to a user at, or near, the time the scene is rendered to the user. Occlusion culling techniques are known to disable the rendering of objects or surfaces that are not visible to a viewpoint because they are obscured (occluded) by other objects or surfaces. For off-line techniques, this is typically done prior to a time that is at, or near, the time the scene is rendered to the user. By avoiding rendering the occluded objects, computational delays otherwise associated with such occlusion computations, are minimized or otherwise avoided. Occlusion culling can be seen as providing advantages to both off-line and on-line image generation techniques. However, since on-line techniques have inherent limitations associated with their live, on-the-fly, near-in-time to rendering the scene to a user characteristics, such as having to generate dynamic images with dynamic user positions and viewpoints, and where live rendering means there is a limited amount of time to perform related computations near-in-time to rendering the image to a user, such on-line systems are seen to particularly benefit by any improved occlusion culling technique that would reduce the amount of computations and otherwise promote a more quick, full a more realistic image rendering to an on-line user's display.

One set of examples of on-line image processing, are those of the on-line virtual reality (VR) systems, where on-the-fly, on-line rendering of images to a user's display are generated, where such images reflect a user's dynamic perspective based on dynamic user head movements, and where data associated with the image are transmitted between a client and a server, and where a significant number of computations are performed on a remote server near-in-time to the final image rendering at the user's client display. Such on-line VR systems are identified here as a form of on-line image processing that can benefit from any reduced processing otherwise typically present in such systems, and thus the introduction of any improved techniques potentially used therein, are identified here as being advantageous to such systems. Thus, for example, adding any new improved culling techniques to an on-line VR system that would reduce image processing calculations and otherwise provide image related data in a quicker and/or a more robust manner, would be seen as providing a user with a more enjoyable VR experience, and thereby seen as an improvement to current on-line VR system architectures.

On-line VR systems may include at least one host device and at least one client device that communicate over a network (e.g., a wireless network, wired network, etc.). For example, a Wi-Fi Direct (WFD) system includes multiple devices communicating over a Wi-Fi network. The server/host device acts as a wireless access point and sends image information, which may include audio video (AV) data, audio data, and/or video data, to one or more client devices participating in a particular peer-to-peer (P2P) group communication session using one or more wireless communication standards, e.g., IEEE 802.11. The image information may be played back at the client devices. More specifically, each of the one or more participating client devices processes the received image information from a server/host device for presentation on its client device display screen and audio equipment. In addition, the server/host device may perform at least some processing of the image information for presentation on the client devices.

The host device, and one or more of the client devices, may be either wireless devices or wired devices with wireless communication capabilities. In one example, as wired devices, one or more of the host device and the client devices may comprise televisions, monitors, projectors, set-top boxes, DVD or Blu-Ray Disc players, digital video recorders, laptop or desktop personal computers, video game consoles, VR headsets and the like, that include wireless communication capabilities. In another example, as wireless devices, one or more of the host device and the client devices may comprise mobile telephones, portable computers with wireless communication cards, personal digital assistants (PDAs), portable media players, or other flash memory devices with wireless communication capabilities, including so-called "smart" phones and "smart" pads or tablets, video game consoles, VR headsets, or other types of wireless communication devices (WCDs).

In some examples, at least one of the client devices may comprise a wearable display device. A wearable display device may comprise any type of wired or wireless display device that is worn on a user's body. As an example, the wearable display device may comprise a wireless head-worn display or wireless head-mounted display (WHMD) that is worn on a user's head in order to position one or more display screens in front of the user's eyes. The host device is typically responsible for performing at least some processing of the image information for display on the wearable display device. The wearable display device is typically responsible for preparing the image information for display at the wearable display device.

SUMMARY

In general, this disclosure relates to the utilization of occlusion techniques that accelerate occlusion computations by reducing the overall amount of occlusion computations required to generate an image in a changing viewpoint environment. Such techniques are seen as potentially beneficial to both off-line and on-line systems, with a particular focus on on-line systems. Conceptually, any potential change in location about a current viewpoint can result in a different image view with the potential exposure of previously occluded portions of a scene image that would now be now visible from that new viewpoint location. Such previously occluded objects and/or surfaces can be, for example, both those of currently backfacing surfaces located adjacent to a silhouette edge on a currently visible object, as well as those of any objects and/or surfaces currently occluded by the currently visible objects. To accelerate occlusion computations by reducing the amount of occlusion computations required to render an associated image in a changing viewpoint environment, this disclosure describes improved techniques of reduced occlusion computations using, for example, one or more trim region rendering techniques.

According to at least one example, this disclosure describes a method of accelerating occlusion computations. This method comprises determining a silhouette edge of an object based on viewpoint information. The method further comprises generating a trim buffer based on viewport information, including generating a trim region bounded by the silhouette edge. The method further comprises generating a disoccluded scene buffer (DSB), including determining whether a triangle is within the trim region, and in response to determining that the triangle is within the trim region, storing the triangle as potential visible set (PVS) image information.

In another example, an apparatus for accelerating occlusion computations, including a memory configured to store potential visible set (PVS) image information and a processor is provided. The processor is configured to determine a silhouette edge of an object based on viewpoint information. The processor is further configured to generate a trim buffer based on viewport information, including generation of a trim region bounded by the silhouette edge. The processor is further configured to generate a disoccluded scene buffer (DSB), including (1) determining whether a triangle is within the trim region, and in response to the determination that the triangle is within the trim region, (2) storing the triangle as potential visible set (PVS) image information.

In another example, an apparatus for accelerating occlusion computations is provided. The apparatus includes means for determining a silhouette edge of an object based on viewpoint information. The apparatus further includes means for generating a trim buffer based on viewport information, including means for generating a trim region bounded by the silhouette edge. The apparatus further includes means for generating a disoccluded scene buffer (DSB), including both a means for determining whether a triangle is within the trim region, and in response to determining that the triangle is within the trim region, a means for storing the triangle as potential visible set (PVS) image information.

In another example, a non-transitory computer-readable medium, having stored thereon instructions that, when executed by one or more processors, cause the one or more processors to: determine a silhouette edge of an object based on viewpoint information, generate a trim buffer based on viewport information, including generating a trim region bounded by the silhouette edge, and generating a disoccluded scene buffer (DSB), including determination whether a triangle is within the trim region, and in response to the determination that the triangle is within the trim region, store the triangle as potential visible set (PVS) image information.

In some aspects, generating a trim buffer based on viewport information, further includes rasterizing trim region depth into a trim buffer, and storing fragments in a per-pixel linked list.

In some aspects, generating a DSB further includes rasterizing the entire scene of a plurality of triangles into a G-buffer.

In some aspects, generating a DSB further includes storing back-facing triangles inside the trim region as PVS information. In some aspects, further comprising harvesting the DSB.

In some aspects, wherein the trim region corresponds to the viewport and the viewport has a width corresponding to a small location adjustment to the viewpoint information.

In some aspects, wherein a geometry shader performs the steps of determining a silhouette edge based on viewpoint information and generates a trim region bounded by the silhouette edge In some aspects, further including receiving the viewpoint information from a client device, and sending the PVS image information to a client device.

In some aspects, wherein the viewport information is based on the movement of the head of a user of a virtual reality system, during rendering delay wherein the rendering delay includes at least one of the following: transmission of the viewpoint information from the client to the server, and transmission of the PVS image information from the server to the client.

In some aspects, further comprising generating a plurality of trim region quads having a quad depth less than a maximum threshold, and sorting the plurality of trim region quads into a plurality of buckets based on quad depth and quad screen-space tile location.

In some aspects wherein sorting the plurality of trim region quads into a plurality of buckets based on quad depth and quad screen space-tile location, further includes: sorting the trim region quads into screen-space tiles, sorting the trim quads by quad depth inside each screen-space tiles, and separating the trim region quads into the plurality of buckets, wherein each bucket in the plurality of buckets, contains a maximum number of trim region quads. In some of such aspects, further including: generating a trim buffer, and generating a disoccluded scene buffer (DSB). In some of such aspects, further including: streaming out the trim region quads into GPU global memory. In some of such aspects, further including rasterizing the trim region quads into static per-bucket sorted lists. In some of such aspects, further including harvesting the DSB.

In some aspects, further comprising performing, iteratively, for individual scene objects of a plurality of scene objects, generating trim region quads of the individual scene object, sorting the trim region quads of the individual scene object into buckets, updating a trim buffer with the trim region of the individual scene object, and updating a DSB for the individual scene object. In such aspects alternatively further comprising harvesting a G-buffer, after performing, iteratively, for individual scene objects of a plurality of scene objects.

In some aspects, wherein sorting the trim region quads of the individual scene object into buckets, further comprising: sorting the trim region quads into screen-space tiles, sorting the trim quads by quad depth inside each screen-space tiles, and separating the trim region quads into the plurality of buckets, wherein each bucket in the plurality of buckets, contains a maximum number of trim region quads.

In some aspects, wherein updating a trim buffer with the trim region of the individual scene object, further comprising: culling trim region fragments that are occluded in the DSB, and inserting remaining trim region fragments into the trim buffer.

In some aspects, wherein updating a DSB for the individual scene object, further comprising: culling object fragments that are contained in the trim buffer, and inserting remaining object fragments into the DSB.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim The foregoing, together with other features and embodiments, will become more apparent upon referring to the following specification, claim and accompanying drawings.

BRIEF DESCRIPTION OF THE DRAWINGS

Illustrative embodiments of the present invention are described in detail below with reference to the following drawing figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements, including that of shaders, without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

*Streaming Virtual Reality*

Figure 1:
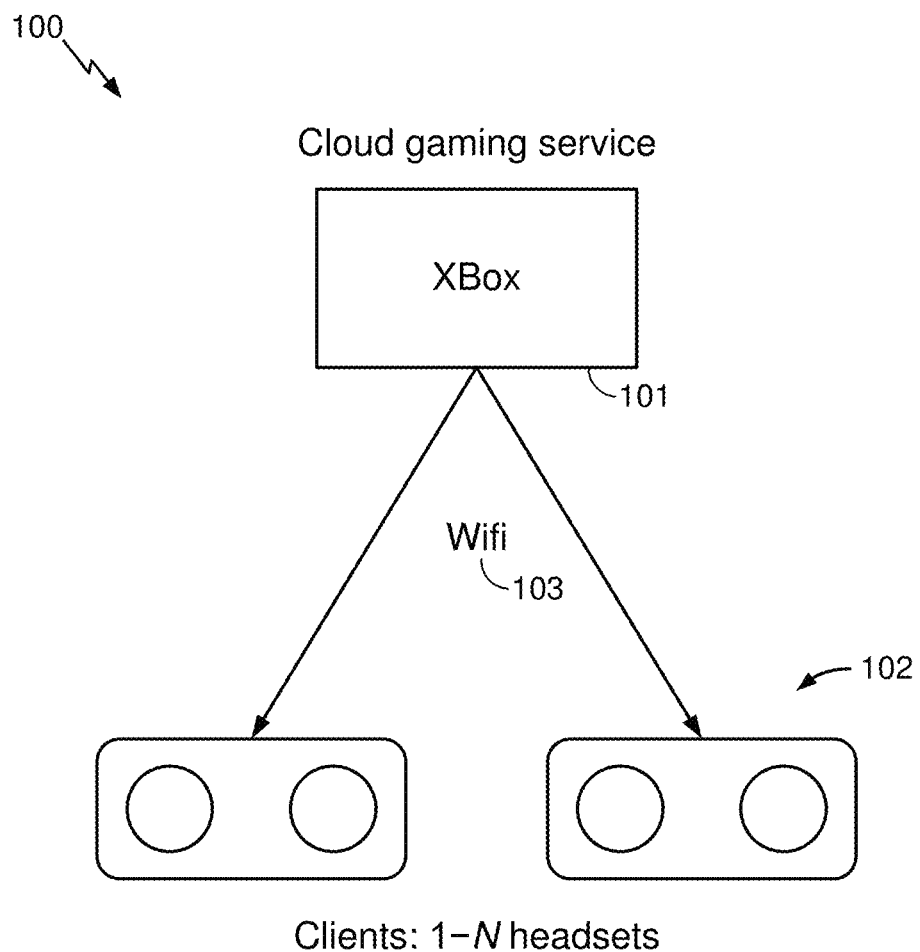
FIG. 1 is a block diagram illustrating an example of a client-server system architecture for a virtual reality (VR) system, in accordance with some examples.

FIG. 1 shows a client-server system architecture 100 for a virtual reality (VR) system. More specifically, FIG. 1 shows a server 101, one or more client VR headsets 102, and communications medium 103 (here shown as wifi) communicatively coupling the server 101 and clients 102. Such systems perform at their best, e.g., with a best user experience level, when there is low latency throughout its architecture and processing functionality.

Server device 101 is referred to as a "server" or "host" in the sense that server device 101 provides intermediate graphics data to VR client headset device 102 via communication medium 103. Communication medium 103 may correspond to a physical communication medium, such as a universal serial bus (USB) cable, high-definition multimedia interface (HDMI) cable, or a DisplayPort cable, or a wireless communication medium, such as Bluetooth or WiFi according to IEEE 802.11. Server device 101 may correspond to, for example, a video game console, a personal computer, smart phone, or tablet computing device executing a video game or other three-dimensional (3D) graphics program. The communications medium 103 may also ideally transport intermediate graphics data that has been modified with one or more types of different compression techniques. It is preferred that any compression technique used is one that is not computationally or data transmission expensive, which might negatively impact latency of the overall system.

VR client headset device 102 represents an example of a VR headset for presenting a virtual location image associated with the virtual location to a wearer/user of VR client headset device 102. The client virtual headset 102 may be a stereoscopic headset. The virtual location image associated with the virtual location of a user, may dynamically change with the actual physical movements of the user. The client headset device 102 may send user viewpoint information indicating the current viewpoint location, viewpoint angle, etc., of a user to the server, and the server may use its GPU functionality to generate intermediate graphics data, including, for example, potential visible set (PVS) image information, and the client receives the intermediate graphics data and uses its GPU functionality to render an image on the VR client headset device 102. The GPU embodied in the VR client headset device 102 need only be of modest capabilities in comparison to the GPU of the server. The client virtual headset 102 can use its GPU functionality to time warp the intermediate graphics data based on the latest tracking of the client virtual headset to compensate for latency (predicted or measured) relating to that of all, or that of a portion, of the overall functionality of the client-server system architecture 100.

\*Client-Server Architecture VR Systems\*

Figure 2:
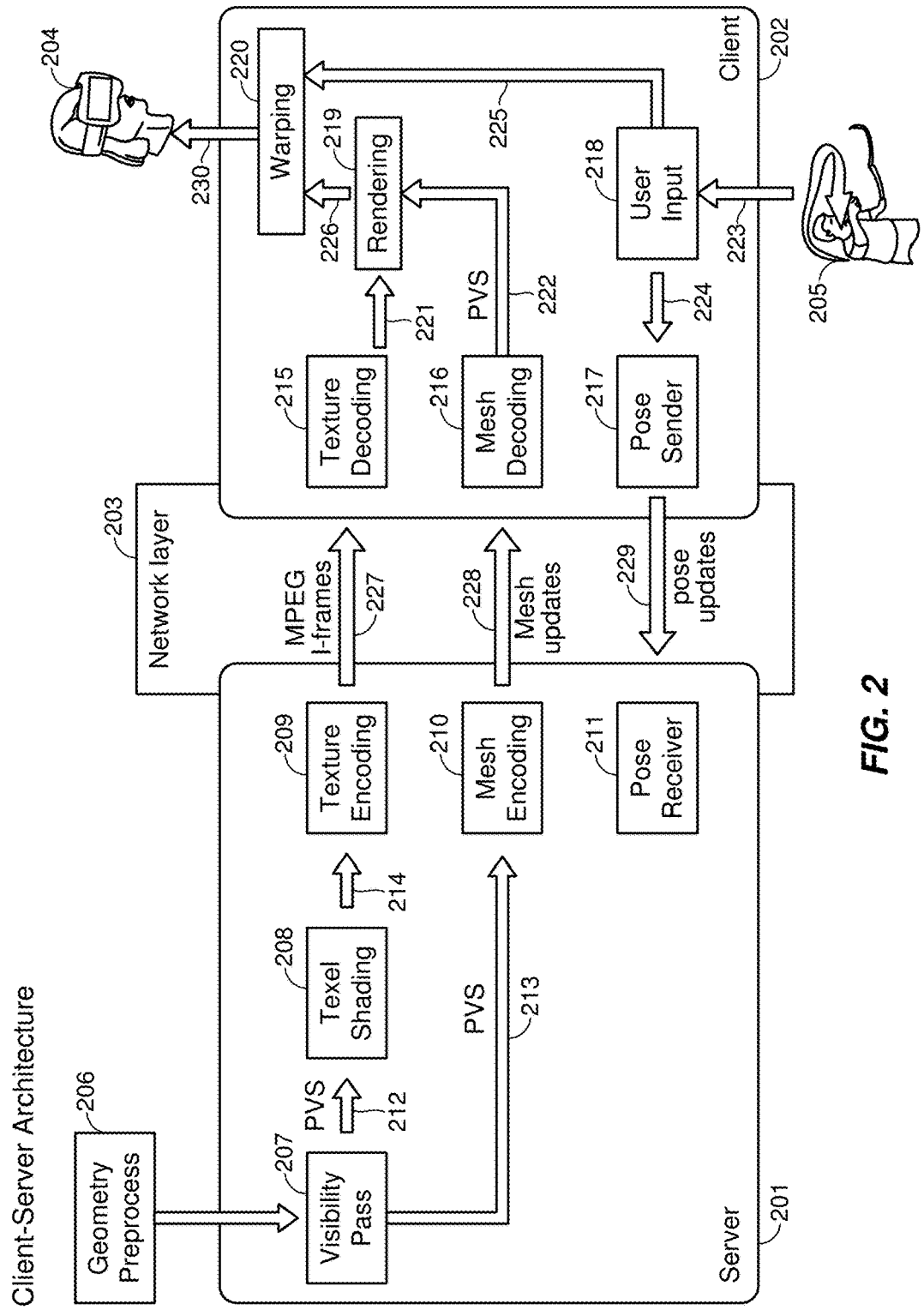
FIG. 2 is a block diagram illustrating an example of client-server system architecture for a virtual reality (VR) system that includes time warping functionality, in accordance with some examples.

FIG. 2 shows an example of the disclosed client-server system architecture for a virtual reality (VR) system that includes time warping functionality. The system shows a server/host 201, a client 202, a network layer 203, a VR headset display 204, and a user 205. Also shown is a geometry preprocess 206 communicatively coupled with server 201. Generally, the input models for the system architecture discussed herein consists of triangles (3-sided polygons). As discussed herein, quads (quadrilateral polygons) are 4-sided polygons. One example of functionality performed by a GPU herein, is that of converting each polygon into fragments (one per pixel location on a screen display).

Time warping, as performed on the client 202, is a technique that is used here, in a VR system, to time warp image information (intermediate graphics data) sent by the host 201, where the image information is based, at least in part, on first viewpoint information associated with the position of the head of the user at a time $T_\alpha$, and where the image information is also based, at least in part, on a second viewpoint information associated with a subsequent position of the head of the user at time $T_{\alpha+\Delta}$, and where the image information includes, at least in part, on-line potential visible set (PVS) image information generated at the server 201, where the time warped image information is then sent to a display to correct (or compensate) for the user's 205 head movement from a first viewpoint at $T_\alpha$ and to a second viewpoint at $T_{\alpha+\Delta}$ to reflect a more accurate display image perspective based upon the second viewpoint information.

Generally, the time segment duration between $T_\alpha$ and $T_{\alpha+\Delta}$, also described here as on-line client-server system delay information, includes therein, for example, at least the time to transmit user first viewpoint information from the client 202 to the host 201, and the time to process of the viewpoint information at the host 201, and time to transmit the on-line potential visible set (PVS) image information, and/or more generally, intermediate graphics data, to the client 201. Such a time segment may also include other durations of time in addition to those mentioned above, such as other processes or functionality that is performed in the client, server or network, and otherwise occurs temporally between the time when a user's location is recorded for the purpose or rendering an image therefrom, and the time when a user actually sees an image rendered and where the user's corresponding location has changed because of movement by the user between $T_\alpha$ and $T_{\alpha+\Delta}$.

Shown within server/host 201 visibility pass functionality 207, texel shading functionality 208, texture encoding functionality 209, mesh encoding functionality 210, pose receiver functionality 211, a first copy of on-line potentially visible set (PVS) image information 212, a second copy of on-line PVS image information 213 and texel shading output 214 (for example, texture atlas information).

Within client 202 is shown texture decoding functionality 215, mesh decoding functionality 216, pose sender functionality 217, user input functionality 218, rendering functionality 219, warping functionality 220, a (post decoded) texture decoding output 221 (for example, texture atlas information), a (mesh decoded) on-line PVS image information 222, user input information 223 including user movement and position information, a first copy of user input data 224, a second copy of copy of user input data 225, rendering information 226 and warped image information output 230.

The network layer 203 shows texture encoding output (MPEG I-frames) 227 data communicated between the texture encoding functionality 209 to the texture decoding functionality 215, mesh encoded (mesh updates) on-line PVS image information 228 communicated between the mesh encoding functionality 210 to the mesh decoding functionality 216, and pose updates 229 data communicated between the pose sender functionality 217 and the pose receiver functionality 211. Together, MPEG I-frames 227, mesh encoded (mesh updates) on-line PVS image information 228 are examples of 3D rendered scene data, or intermediate graphics data, provided by server/host device 201. The pose updates 229 is an example of pose updates 229, e.g., user viewpoint information, provided by the client 202.

\*Potentially Visible Set (PVS) Techniques\*

As disclosed herein, new potentially visible set (PVS) techniques, generated at a server/host, can be used in the operation of rendering three dimensional (3D) environments, such as VR, to temporally accelerate rendering at a client and otherwise provide a more real-world-like experience for the user. The PVS techniques represent a form of occlusion culling where a set of potentially visible triangles (potential visible set) are pre-computed, on-line, by a geometry shader for example, at a server/host. The PVS techniques are used to modify the more standard graphics buffer (G-Buffer) rendering, otherwise performed on a single viewpoint perspective, to a more robust viewport approach that takes into account, for example, relatively small location adjustments of an original single viewpoint position (viewport) and provides rendering data extending relatively nearby and about the original single viewpoint position and represent, for example, a limited set of potential viewpoints of the user's head based on a maximum distance that the user's head may move in a particular time period. That particular time period, for example, can be the on-line client-server system delay described above. The viewport can represent all the potential viewpoint positions, away from the initial viewpoint position, associated with the relatively small location adjustments.

Such techniques could be useful, for example, where a server/host device provides a 3D rendered scene data according to a user's first head position (first viewpoint) given at a first time α, and where the 3D rendered scene data (on-line PVS image information) is made available for processing at a client device later at second time α+Δ, and where at such second time the user's head position may have transitioned to relatively different nearby location (second viewpoint). Here, the first viewpoint of the user is known, but the second viewpoint is unknown, and thus, a sample disclosed technique would include the determination of a maximum head movement for a particular duration and operate to provide rendering data for a viewport corresponding to a limited set of potential viewpoint positions of a user. To determine a maximum head movement for any particular time duration, the host/server 201 could use, for example, a maximum head movement speed information. This maximum head movement speed information can be a predetermined head movement speed, or can be dynamic, and can be provided or calculated at either the server/host 201, the network layer 203, and/or the client 202.

With such PVS techniques, on-line PVS image information, can be generated on-line, on-the fly, in a geometry shader for example, on the server/host device and then sent to the client. In such described circumstances, using the disclosed PVS techniques, the user's visual image can be displayed not according to an original first viewpoint perspective associated with the user's head position at first viewpoint time α, but instead can be displayed according to the user's second, changed head position (second viewpoint) at second viewpoint time α+Δ.

Such disclosed PVS techniques provide for a noticeably better viewing experience for the user and a relatively lower cost in processing data and/or associated data communication rates. The first viewpoint may be stored as first viewpoint information and the first viewpoint information may contain other useful related data. The second viewpoint may be stored as second viewpoint information and the second viewpoint information may contain other useful related data. The first viewpoint time is temporally less than the second viewpoint time. The first viewpoint time is temporally less than (before) the time the information indicative of the first viewpoint is sent to the host device. The second viewpoint time is temporally greater than (later) the time the on-line PVS image information is received from the host device.

*PVS+G-Buffer*

The combination of the use of PVS functionality in conjunction with standard G-buffer functionality can be described, for example, as occurring in visibility pass 207 (See FIG. 2) functionality with G-buffer functionality. An example of a standard G-buffer functionality includes the determination of visible triangles on a graphics processing unit (GPU) where, on a first pass, the G-Buffer is rendered consisting of depth+id, and, on a second pass, reducing the information of an id-buffer to an id-list. This example of determining the visible triangles yields an exact visible set (EVS) of currently visible triangles associated with an original single viewpoint. Next, an example of a PVS technique disclosed herein includes, the defining of a viewport around, and relatively nearby, a current/original/first viewpoint. Triangles that are determined to be visible from anywhere within the viewport are added/stored to the PVS (PVS image information). Once complete, the PVS image information generated at the server/host is then sent to a client. The use, at the client, of the PVS functionality, in addition to that of the G-buffer functionality, allows for such a client to render and send data to its associated display that takes into account the potential user head movements and associated viewpoint location changes, and the corresponding changes in viewpoints, and that otherwise are expected to fall somewhere within the predetermined viewport.

As the use of PVS image information have been traditionally limited to offline computations for static scenes, the newly proposed robust on-line PVS techniques disclosed herein provide not only advantages for such offline computations, but provide for particularly useful advantages in the area of on-line computations, such as those found in 3D image rendering, and more specifically for such online VR systems. The ever-increasing computation and data communication demands associated with 3D online VR systems and the associated rendering on user displays/headsets are seen as receiving significant benefit from the introduction of the newly disclosed on-line PVS techniques that accelerate occlusion computations.

*Offline Computation of PVS*

Figure 3:
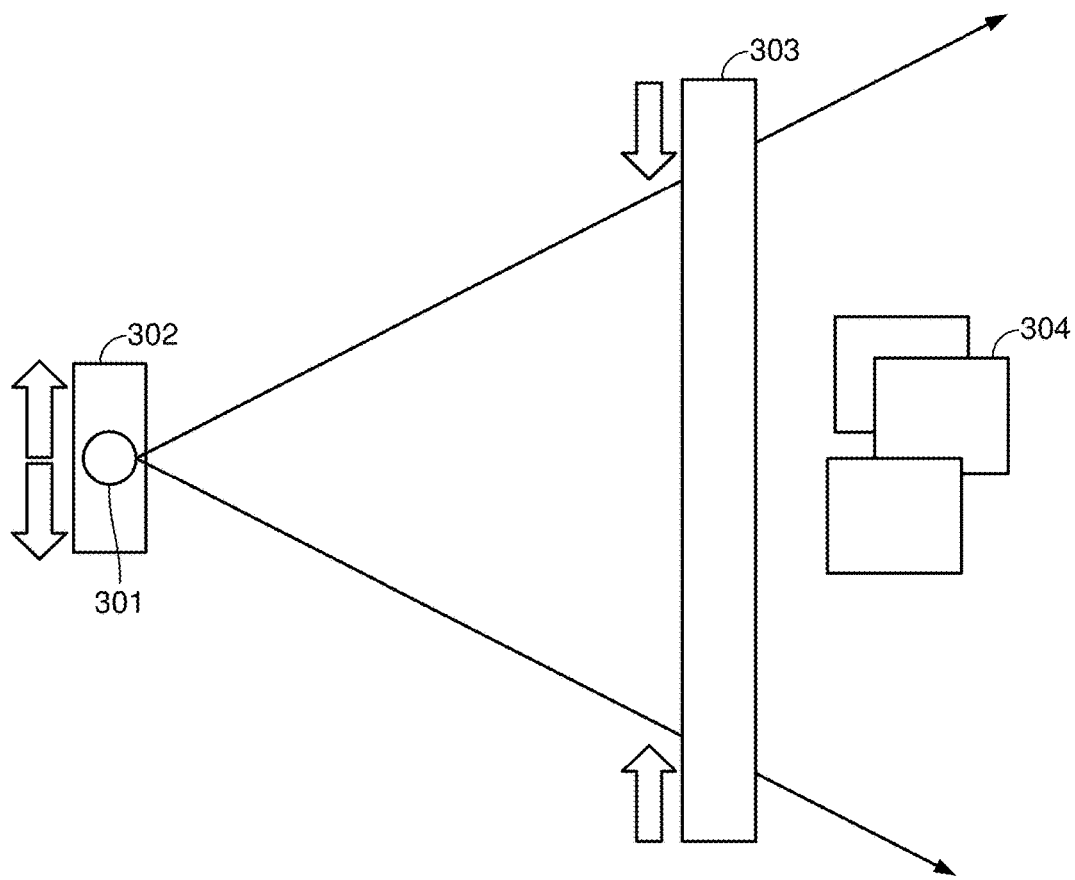
FIG. 3. is a diagram illustrating an example of traditional offline computation of PVS from a viewport, in accordance with some examples.

An example of a traditional offline computation of PVS from a viewport can be found in (Peter Wonka, Michael Wimmer, and Dieter Schmalstieg. Visibility Preprocessing with Occluder Fusion for Urban Walkthroughs. In Proceedings of the 11th EUROGRAPHICS Workshop on Rendering (EGRWS'00), pages 71-82, Brno, Slovakia, June 2000). Described therein is the example of both the enlarging of a viewport location and the shrinking of occluding objects. Enlarging the viewport shows the idea that enlargement about the original viewpoint would otherwise expose portions of objects not currently in view, but with a slight change in the location of the original single viewpoint, such as those within the enlarged viewport, such hidden portions of objects may then come into view. More specifically, the example includes occluder shrinking that includes enlarging a viewpoint to a viewport and approximating any disocclusion effects. As shown in the FIG. 3, with originally occluded objects 304, the viewpoint 301 is expanded to include other viewpoints within expanded view cell 302. FIG. 3 also shows the shrinking of occluding objects where, for viewpoints within the viewport 302, a process shrinks all occluders (e.g., 303) and separately samples the viewpoints 301 within the viewport 302 and calculates the union of all the PVS image information from each of the separate sample viewpoint calculations.

*Online PVS with Trim Region Rendering*

Disclosed herein are online PVS techniques that utilize, for example, a geometry shader, to achieve multiple benefits in conjunction with graphics processing in 3D environments. For example, the online PVS techniques disclosed herein utilize trim region rendering (TRR) functionality to provide new ways of predicting what may be potentially visible to the user in the near future, and which can be utilized advantageously in various 3D applications, such as time warping in VR systems, to achieve more up-to-date appearing images for presentation to the user based on a user's actual viewing viewpoint at the actual time the user is viewing such images. An overall representative online PVS technique may include (I) the finding of silhouette edges of a visible object via, for example, a geometry shader, (II) performing PVS estimation techniques using trim region rendering, and (III) performing PVS estimation techniques using generous silhouettes. Further, below are disclosed multiple different versions (II.A, II.B & II.C (see below)) of the (II) PVS estimation using trim region rendering mentioned immediately above.

Figure 4:
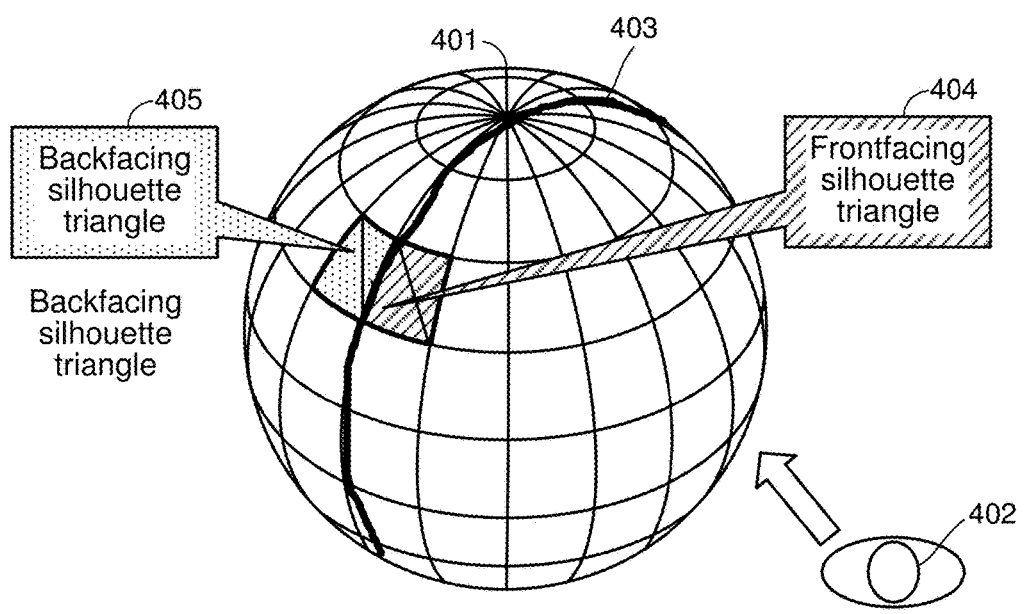
FIG. 4 is a diagram illustrating a technique using online PVS with trim region rending, in accordance with some examples.

FIG. 4 generally shows a high-level representation of a technique using online PVS with trim region rendering. More specifically, FIG. 4 shows an object 401 and a viewpoint/viewpoint 402 toward the visible object 401. Also shown is a silhouette edge 403 associated with viewpoint/viewpoint 402. A front-facing silhouette triangle 404 and a back-facing silhouette triangle 405 are also shown.

We note here that other back-facing triangles that may be adjacent to the back-facing silhouette triangle 405 are not particularly shown here, but exist, as well as other back-facing triangles that may be adjacent to either of these the back-facing triangles or to other adjacent back-facing triangles, and that may otherwise located within a trim region and that may be available for calculating a generous (back-facing) silhouette as discussed in greater detail below.

Here the front facing silhouette triangle 404 is within view of the view/viewpoint 402 while the back-facing silhouette triangle 405 is outside the view of the view/viewpoint 402. From an online PVS technique standpoint, for example, we propose that it would be advantageous to calculate, online, at a host/server, back-facing silhouette triangles such as back-facing silhouette triangle 405, as well as other back-facing triangles falling within a desired limited area trim region associated with a viewport, as to have such data available to a client device with time warp functionality to support relatively slight changes to the location of viewpoint 402.

*I. Find Silhouette Edges*

First, perform the process of finding the silhouette edge 403 of a visible object 401. Here, in conjunction with the finding of silhouette edge 403, operate to store a triangle list with adjacency to the silhouette edge 403 where such triangle list includes an edge that has an adjacent vertex. Adjacent triangles, of which one is front-facing and one is back-facing, are on the silhouette edge 403. An example of using a triangle list with adjacency can be found in Microsoft DirectX 10. Such functionality is performed with, for example, a geometry shader. Once the silhouette edges are determined, the online PVS estimation is performed, generating online PVS image information to be later sent to the client.

*II. PVS Estimation Using Trim Region Rendering (TRR)*

For PVS estimation using trim region rendering, the goal is to anticipate disocclusion by visibility heuristic increase. PVS estimation heuristic 1 operates by cutting all triangles inside a trim region near front-facing silhouette triangles. Next, the process operates to include the trimmed triangles in the PVS (PVS image information). Finally, the process operates to exclude the trimmed triangles from the G-buffer to force disocclusion of hidden layers. Below, multiple different examples are disclosed (II.A. TRR v1—trim region about a silhouette edge, II.B. TRR v2—course to fine sorting of trim regions & II.C. TRR v3—iterative building of occluded volumes) of PVS estimation using trim region rendering.

II.A. TRR v1—Trim Region About a Silhouette Edge

Figure 5:
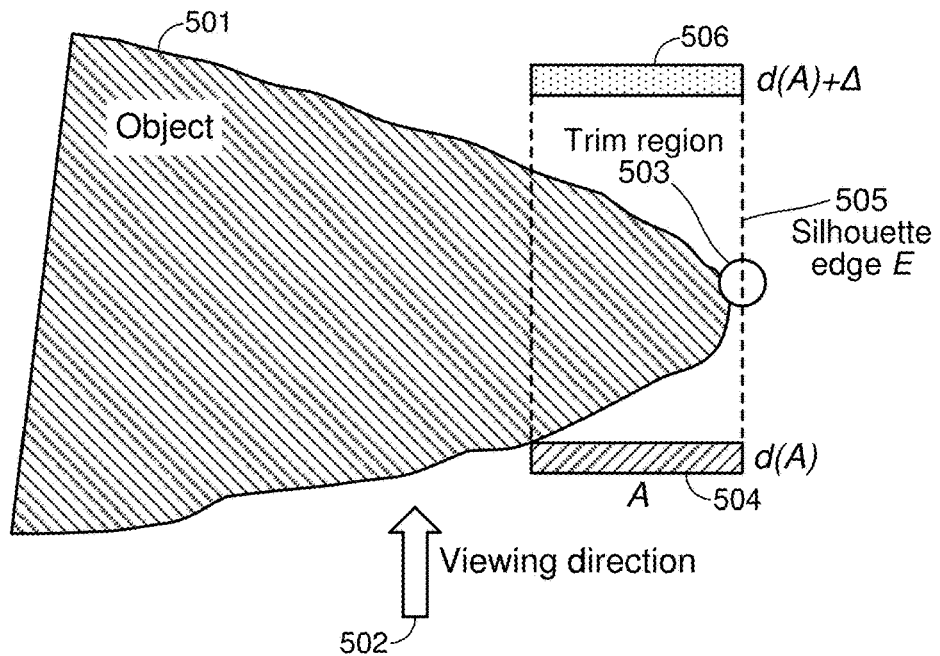
FIG. 5 is a diagram illustrating a visible object and trim region around a silhouette edge, in accordance with some examples.

FIG. 5 shows an above view of visible object 501 and shows the viewing direction 502. Also shown is a trim region 503 around the silhouette of width "A" 504 and bounded by silhouette edge E 505. Also shown, and as associated with visible object 501 trim region width "A" 504, at d(A), is a second initially occluded width d(A)+Δ 506. The TRR v1 example includes three passes: a pass 1 (create trim buffer), a pass 2 (create disoccluded scene buffer (DSB)), and a pass 3 (harvest DSB-reduction of id-buffer to id-list).

*Pass 1*

Figure 6:
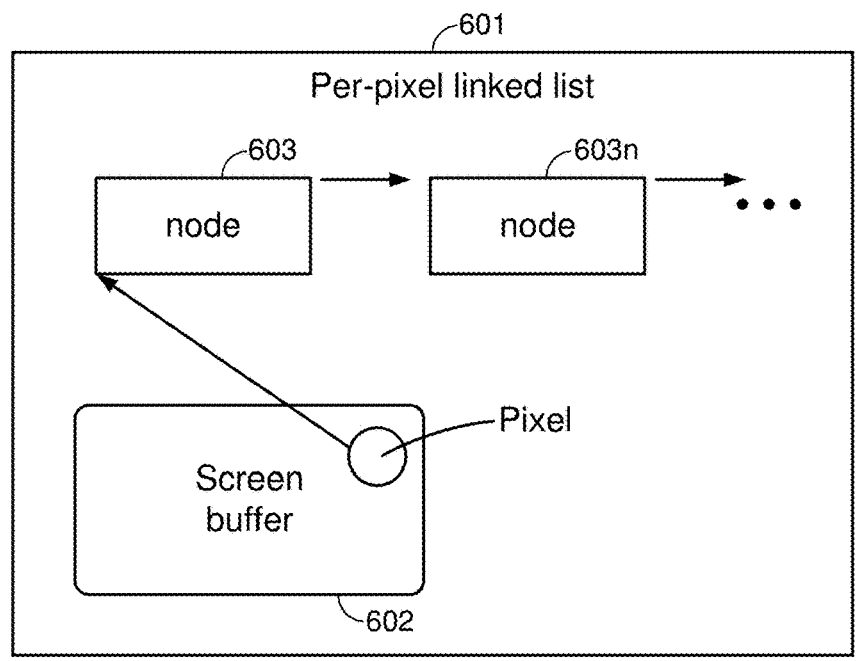
FIG. 6 is a diagram illustrating a per-pixel linked list associated with FIG. 5, in accordance with some examples.

In TRR v1 pass 1, a trim buffer is created and includes determining a trim region 503 bounded by the silhouette edge E 505 where the silhouette edge E 505 is the edge between a front-facing and back-facing triangle. The geometry shader, for example, then determines a trim region quad A 504 from silhouette edge E 505. The depth of trim region quad A is then rasterized, by a fragment shader, for example, into a trim buffer. The resulting fragments are stored, by a fragment shader, in a per-pixel linked list, where the list is sorted by depth and the list stores K depth entries in one node, then links to the next node. FIG. 6 shows a per-pixel linked list 601 with a screen buffer 602 and nodes 603 thru 603n.

*Pass 2*

In TRR v1 pass 2, a disoccluded scene buffer is determined and where the process includes rasterizing the entire scene into G-buffer (depth+id). A geometry shader tests vertices for containment in trim region [d(A), d(A)+Δ]. If at least one vertex is inside any trim region, then the process does not rasterize triangle, but adds it to the online PVS image information using the geometry shader, for example. The process then rasterizes the entire scene (depth+id), using the fragment shader, for example, resulting with id-buffer containing the rest of the online PVS image information.

*Pass 3*

Figure 7A:
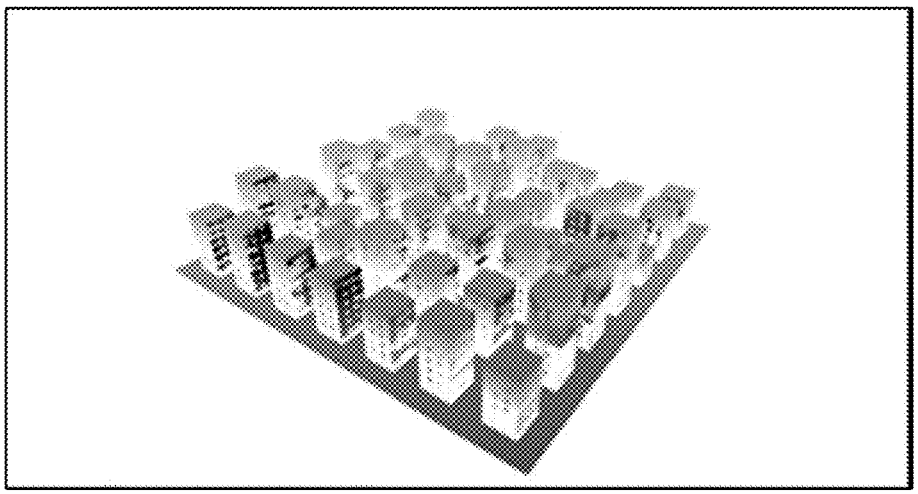
FIG. 7A is a diagram illustrating a city scene of buildings, in accordance with some examples.

In TRR v2 pass 3, DSB-reduction of id-buffer is harvested to id-list. FIG. 7a shows a city scene of buildings.

II. B. TRR v2—Course to Fine Sorting of Trim Regions

Figure 7B:
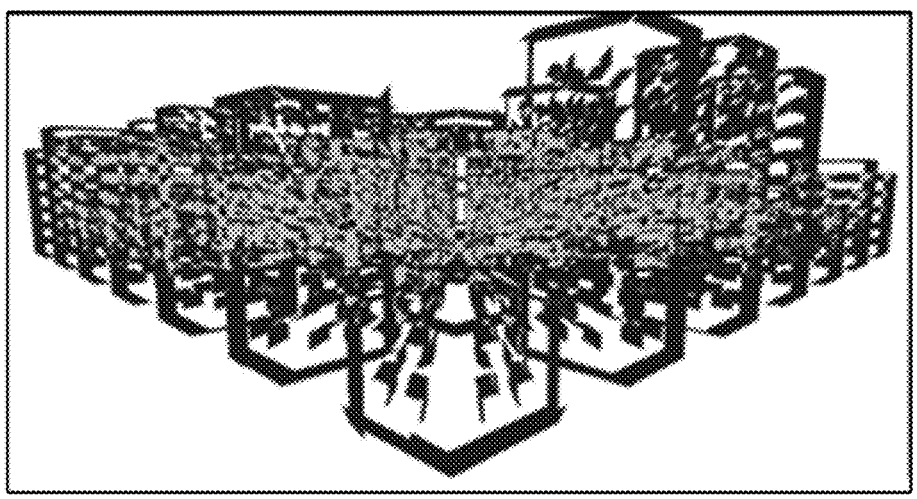
FIG. 7B is a diagram illustrating color-coded linked list depth map associated with FIG. 7a, in accordance with some examples.
Figure 8:
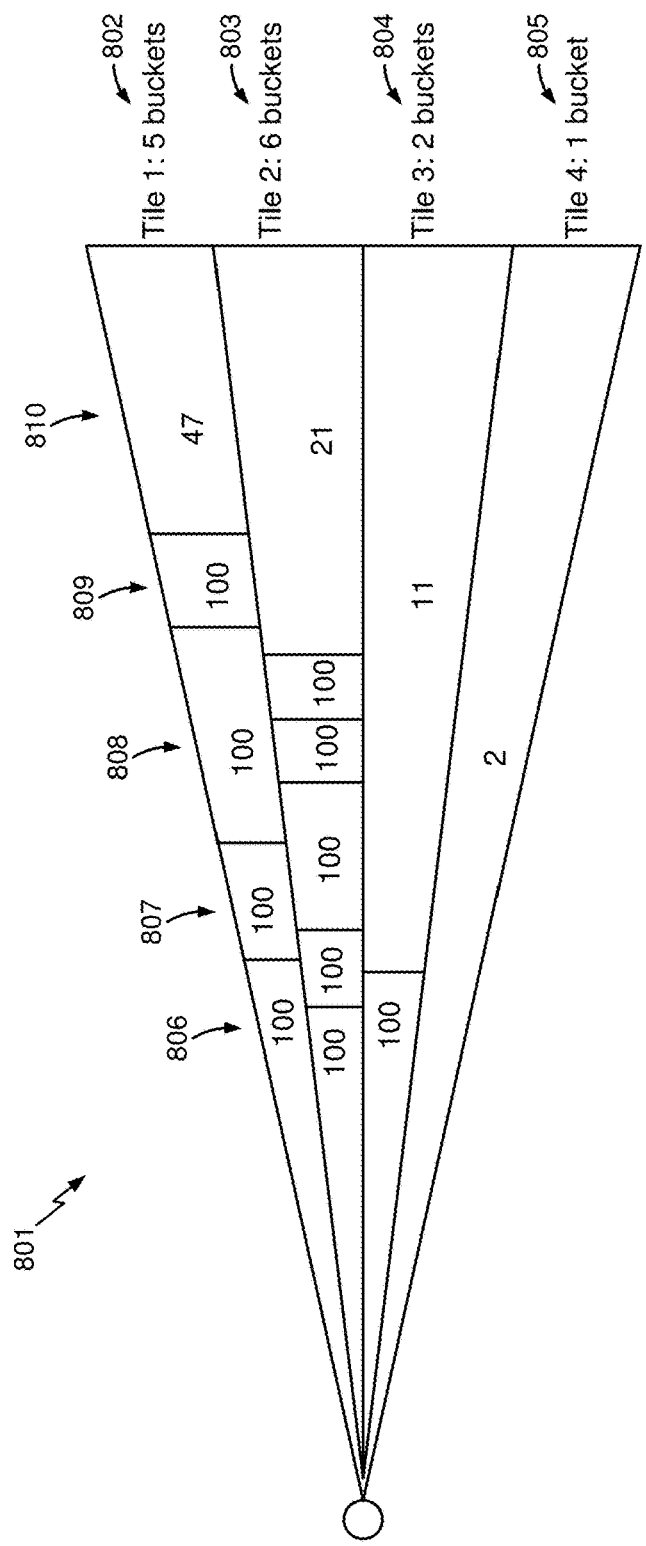
FIG. 8 is a diagram illustrating trim regions quads sorted into a view aligned grid.

FIG. 7b shows a corresponding color-coded linked list depth map corresponding to that of the city scene of buildings in FIG. 7a. FIG. 7b is shown here in grayscale where the lighter gray areas correspond to more objects overlapping along the associated viewray (i.e., overdraw). The largest list depths can be seen towards the middle and top of the color-coded linked list depth map. Such a depth map can be utilized in trim region rendering. For example, the trim region rendering version 2 example includes a coarse-to-fine sorting of trim regions technique that avoids the relatively expensive sorting by full per fragment depth. Here, trim regions quads are sorted by minimum depth into a view aligned grid 801 as shown in FIG. 8. As used here, trim region quad (quadrilateral polygon (4 sided polygon)) is a special polygon created on the fly, for example, by a geometry shader. Such trim region quads are only used inside the trim region algorithm to create a stencil (for example, in the form of per-pixel linked lists) to indicate where a depth test is performed of a triangle fragment against the trim region buffer. The view-aligned grid 801 consists of variable depth buckets for different views. The example in FIG. 8 shows tile 1 802, tile 2 803, tile 3 804 and tile 4 805. Here the tile number count is T=4 and bucket number count is B=14. For example, Tile 1 802 contains the 5 buckets 806-810. The example maintains a bucket maximum of N=100 quads, for example. The total quads stored here is Q=1081 where B=floor(Q/N)+T.

The trim region rendering version 2 example shown includes 5 passes: pass 1 (create trim region quads), pass 2 (sort trim region quads), pass 3 (create trim buffer), pass 4 (create DSB), and pass 5 (harvest DSB).

*Pass 1*

In TRR v2 pass 1, the trim region quads are created and includes generating the trim region quads, discarding those relatively too far away (i.e., if disparity<threshold), and then streaming out the trim region quads to a GPU global memory, for example. Those too far away can be said to be beyond a maximum trim region quad distance.

*Pass 2*

In TRR v2 pass 2, the trim region quads are sorted and includes the sorting of the trim region quads by minimal width. A first-level sort is into trim region quad screen-space tiles. Next, a second level sort is by trim region quad depth in side each screen-space tile. Lastly, each tile is split into buckets, each with a bucket width and a bucket depth, and each bucket having a fixed maximum number of trim region quads, some of which contain the maximum, while some buckets may include less. Those that include less may be, for example, a last calculated bucket otherwise containing less than the maximum number of trim region quads, but more than 0. The overall result is a 3D subdivision into a variable number of buckets, the majority with the same amount of data.

*Pass 3*

In TRR v2 pass 3, the trim buffer is generated and includes the traversal of the trim region quads in K rendering passes where in each pass, each thread takes the K-th trim region quad from its gridcell/bucket. Then the trim region quads are rasterized into static per-gridcell/bucket sorted lists. If Pass 2 sorting is effective, it is anticipated that most list-insertions will be cheap list-append operations. The process then includes that if a fragment is already inside the existing trim region [d(A), d(A)+Δ], it is discarded.

*Pass 4*

In TRR v2 pass 4, the DSB is generated.

*Pass 5*

In TRR pass 5, the DSB is harvested.

II.C. TRR v3—Iterative Building of Occluded Volumes

Figure 9:
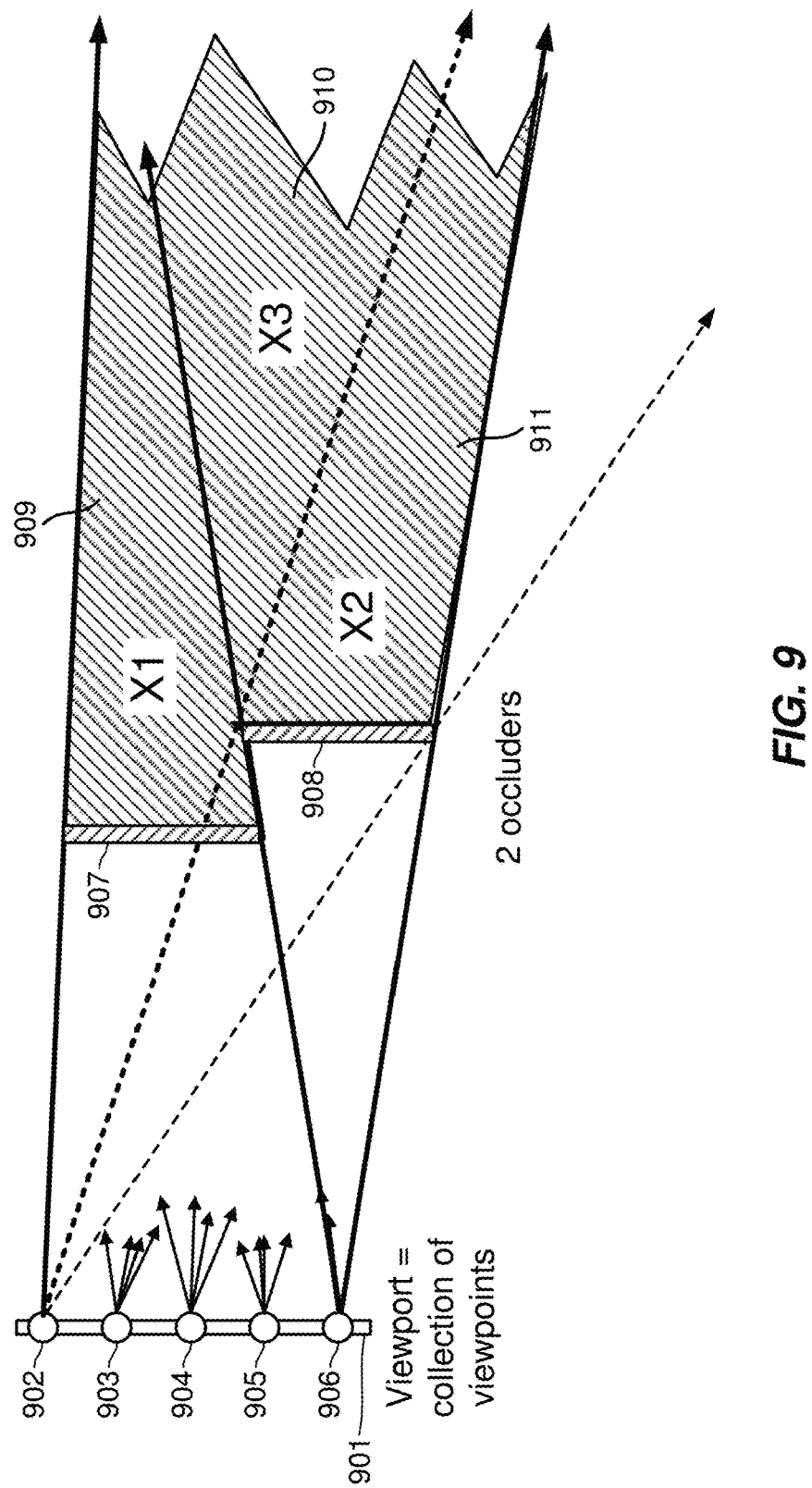
FIG. 9 is a diagram illustrating aspects of occluder fusion, in accordance with some examples.

Before discussing trim region rendering version 3, we first provide here a general discussion on occluder fusion. Conventional PVS generation is known to use occluder fusion. FIG. 9 is a useful visual aid in describing aspects of occluder fusion. FIG. 9 shows viewport 901, viewpoints/viewpoints 902-906, occluders 907 & 908, and occluded areas X1 909, X2 910 and X3 911. Area X3 911 is totally occluded for every viewpoint in the viewcell. Thus, one cannot compute X3 911 as a union of X1 909 and X2 910, and a special iterative method is needed for building the occluded volume.

The iterative method typically includes the use of two spatial data structures including a first for scene-objects described as objects in the scene that we want to render, with each having many triangles, and a second for occluded volumes described as part of the space of which we know (so far) that is occluded. The iterative method also includes iterating over the scene objects where one tests each object against the occluded volume. If the object is fully occluded, it is skipped. If not fully occluded, the object is rendered and merged into the occluded volume. The iterative method includes, that for a viewpoint, one can use G-buffer (depth+id) as the occluded volume. This can be done using GPU visibility queries (see Mattausch, O., Bittner, J. and Wimmer, M. (2008), CHC++: Coherent Hierarchical Culling Revisited. Computer Graphics Forum, 27: 221-230. doi: 10.1111/j.1467-8659.2008.01119.x), or using a second lower resolution depth buffer (see Zhang, Manocha, Hudson, Hoff. Visibility culling using hierarchical occlusion maps. SIGGRAPH '97, 77-88.), maintained in the fragment shader (or use early-z culling information from the GPU if available).

Trim region rendering version 3, (iterative building of occluded volumes), includes the idea that occluded disoccluders are irrelevant. This new idea, disclosed here, expands from the occluder fusion discussed above. The thought, as disclosed here, is that if we have partial occlusion by trimmed scene objects, a system can operate to cull disoccluders. Here a system can interleave scene object rendering and trim region rendering. To achieve this, a system can use the three spatial data structures from TRR v2 again, namely (1) scene objects, (2) trim buffer and (3) DSB. But, where TRR v2 had the separate passes for trim buffer and DSB, the trim region rendering version 3 iterates over all objects and does a "mini TRR v2" each time. Trim region rendering version 3 utilizes a total of 4N+1 passes, where N=number of objects.

*Pass 1 to Pass 4N*

Operationally, the trim region rendering version 3, (iterative building of occluded volumes), operates on all N objects, for all Oi in $\{O_0 \ldots O_{N-1}\}$, resulting in 4 additional passes for each object, and the system operates repeatedly as follows for each $O_i$. In pass 4i+1, it operates to generate trim region quads of Oi, where it operates to compute trim region quads for Oi and stream them out. In pass 4i+2, it operates to sort trim region quads of $O_i$, where it sorts new trim region quads into buckets. In pass 4i+3, it operates to update the trim buffer (=disoccluded-volume) with trim region for Oi, where it rasterizes new trim regions, culls trim region fragments that are occluded in the DSB, and inserts remaining trim region fragments into trim buffer. In pass 4i+4 (=4N), it updates the DSB with Oi, where it rasterizes Oi, then culls object fragments that are contained in the trim buffer, and inserts remaining object fragments into the DSB.

*Pass 4N+1*

Once the above 4N passes has completed for each N objects, then in one additional pass, pass 4N+1, the system additionally operates to harvest G-buffer, where there is a reduction of the id-buffer to an id-list.

*III. PVS Estimation Using Generous Silhouettes*

PVS estimation using generous silhouettes operates to include in the PVS (PVS image information) all back-facing triangles inside the trim region. Once assembled, the PVS image information can be sent to a client device.

Figure 10:
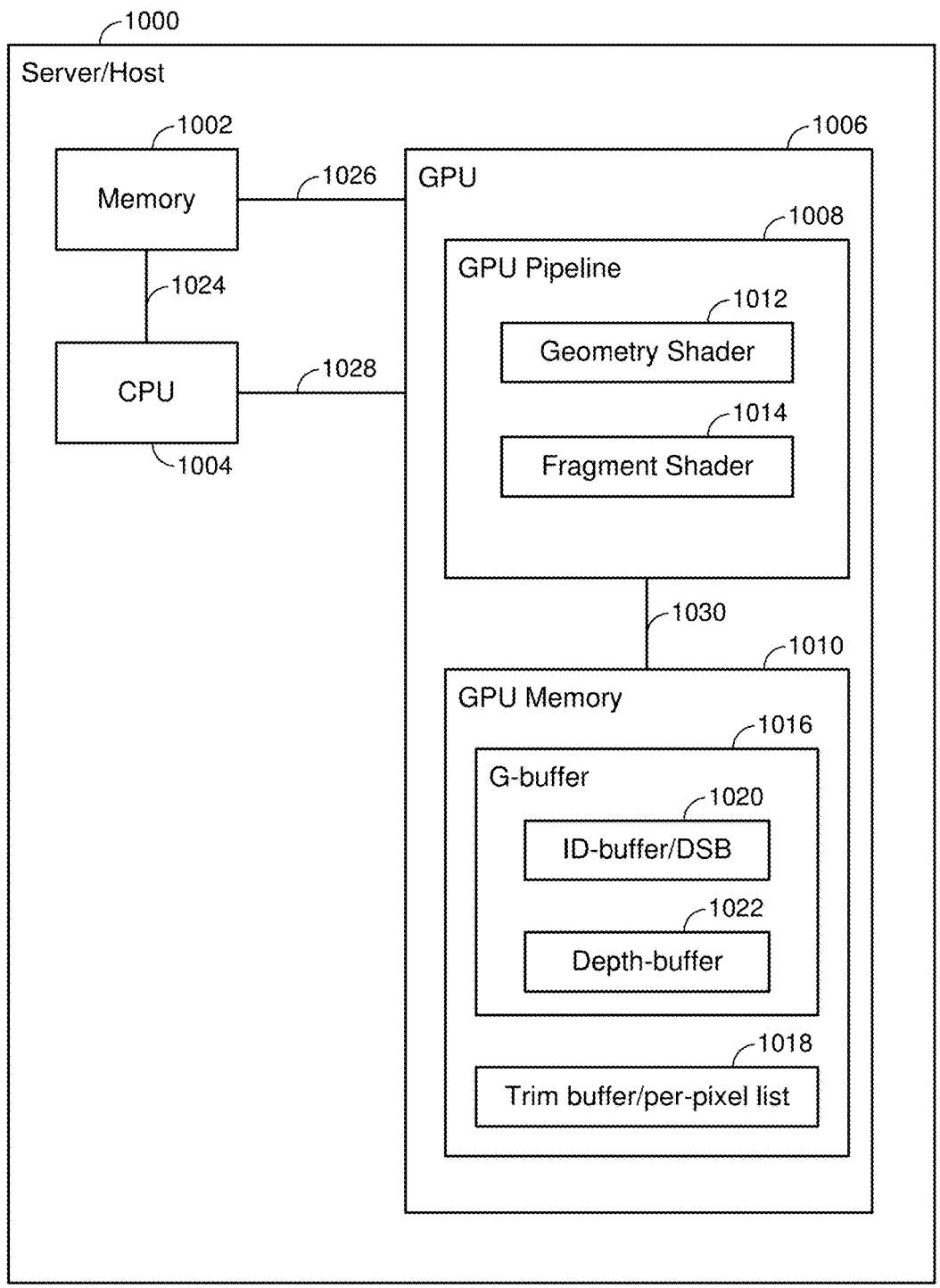
FIG. 10 is a block diagram illustrating an example of a server/host device, in accordance with some examples.

In FIG. 10 one exemplary architecture is shown that can perform one or more examples of techniques disclosed herein. A server 1000 includes a memory 1002, a CPU 1004 and a GPU 1006. Memory 1002 is communicably coupled to CPU 1004 via link 1024 and to GPU 1006 via link 1026. The GPU is also communicably coupled to CPU 1004 via link 1028. The GPU 1006 includes a GPU pipeline 1008 and a GPU memory 1010. The GPU pipeline 1008 is communicably coupled to GPU memory 1010 via link 1030. The GPU pipeline 1008 includes a geometry shader 1012 and fragment shader 1014. The GPU memory 1010 includes a G-buffer 1016 and a trim buffer/pixel linked list 1018. The G-buffer 1016 includes an id-buffer/DSB 1020 and a depth buffer 1022. Not specifically shown, but in at least one example, PVS image information may correspond to both the DSB and the triangles selected to generate the trim buffer.

Figure 11:
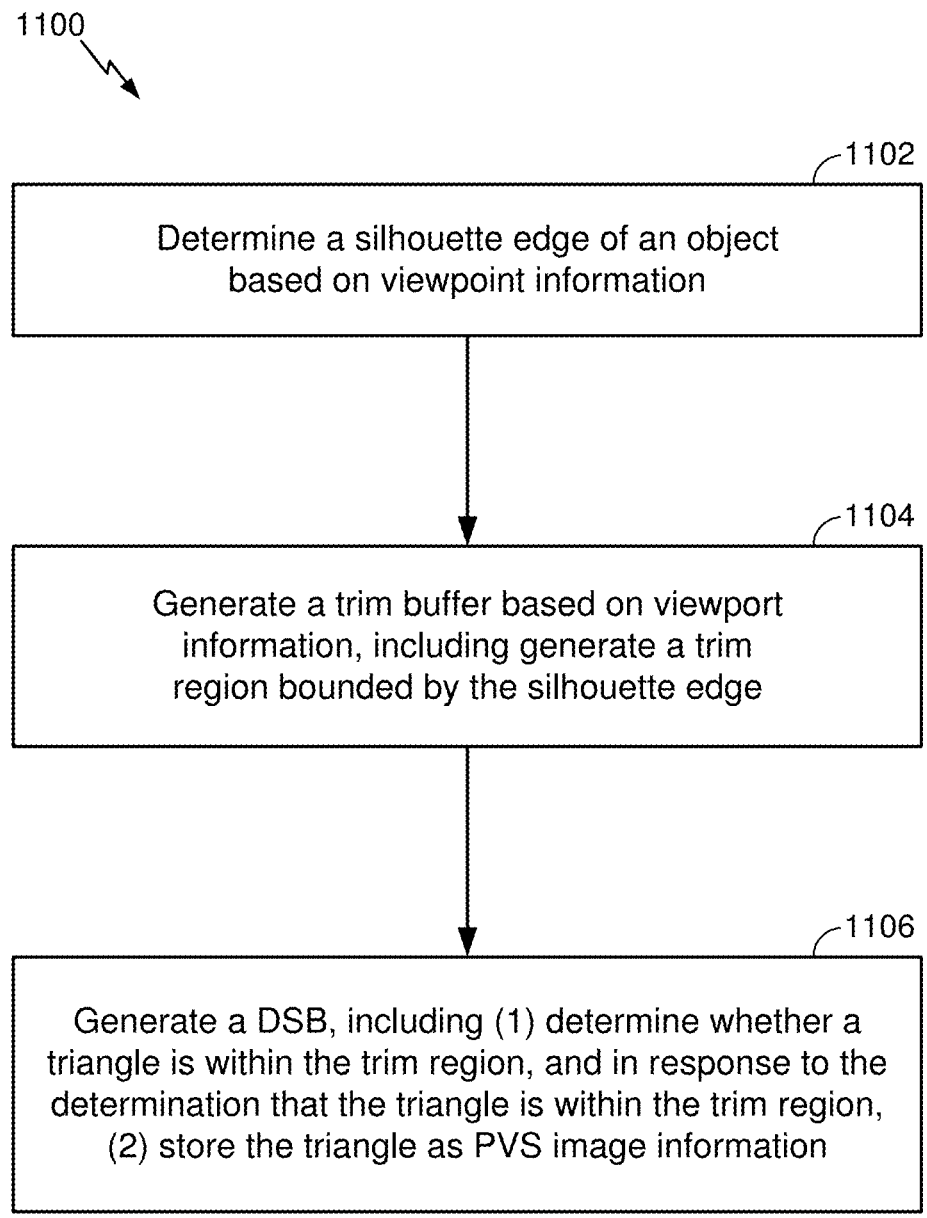
FIG. 11 is a flowchart illustrating an example process of server within a client-server system architecture for a virtual reality (VR) system, in accordance with some examples.

FIG. 11 shows one example of a disclosed accelerating occlusion computation method disclosed herein. A method 1100 is shown including the step 1102 of determining a silhouette edge of an object based on viewpoint information. Next, a step 1104 of generating a trim buffer based on viewport information, including the step of generating a trim region bounded by the silhouette edge may be performed. Next, a step 1108 may be performed and includes generating a DSB, including both the steps of (1) determining whether a triangle is within the trim region, and in response to determining that the triangle is within the trim region, (2) storing the triangle as PVS image information.

In some examples, the process 1100 may be performed by a computing device or an apparatus, such as a server/host 1000, or any other computing device. In some cases, the computing device or apparatus may include a processor, microprocessor, microcomputer, or other component of a device that is configured to carry out the steps of process 1100. The computing device may further include a network interface configured to communicate the video data. The network interface may be configured to communicate Internet Protocol (IP) based data or other network data.

Process 1100 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of accelerating occlusion computations, the method comprising:
   determining a silhouette edge of an object based on viewpoint information,
   generating a trim buffer based on viewport information, including the step of generating a trim region bounded by the silhouette edge,
   generating a disoccluded scene buffer (DSB), including both the steps of (1) determining whether a triangle is within the trim region, and in response to determining that the triangle is within the trim region, (2) storing the triangle as potential visible set (PVS) image information,
   generating a plurality of trim region quads having a quad depth less than a maximum threshold, and
   sorting the plurality of trim region quads into a plurality of buckets based on quad depth.

2. The method of claim 1, wherein the step of generating a trim buffer based on viewport information, further comprises:
   rasterizing trim region depth into the trim buffer, and
   storing fragments in a per-pixel linked list.

3. The method of claim 1, wherein the step of generating a DSB further comprises:
   rasterizing entire scenes of a plurality of triangles into a G-buffer.

4. The method of claim 1, further comprising storing back-facing triangles inside the trim region as PVS image information.

5. The method of claim 1, further comprising harvesting the DSB.

6. The method of claim 1, wherein the trim region corresponds to the viewport and the viewport has a width corresponding to a small location adjustment to the viewpoint information.

7. The method of claim 1, wherein a geometry shader performs the steps of determining a silhouette edge based on the viewpoint information and generating the trim region bounded by the silhouette edge.

8. The method of claim 1, further comprising:
receiving the viewpoint information from a client device, and
sending the PVS image information to the client device.

9. The method of claim 1, wherein the viewport information is based on the movement of the head of a user of a virtual reality system during rendering delay wherein the rendering delay includes, at least one of the following: transmission of the viewpoint information from the client to the server, and transmission of the PVS image information from the server to the client.

10. The method of claim 1, further comprising:
wherein sorting the plurality of trim region quads into a plurality of buckets is further based on quad screen-space tile location.

11. The method of claim 10, wherein the step of sorting the plurality of trim region quads into a plurality of buckets based on quad depth and quad screen space-tile location, further comprising:
sorting the trim region quads into the screen-space tiles locations,
sorting the trim quads by quad depth inside each screen-space tiles location, and
separating the trim region quads into the plurality of buckets, wherein each bucket in the plurality of buckets, contains a maximum number of trim region quads.

12. The method of claim 10, further comprising the steps of:
generating a trim buffer, and
generating a disoccluded scene buffer (DSB).

13. The method of claim 10, further comprising streaming out the trim region quads into GPU global memory.

14. The method of claim 10, wherein the step of generating a trim buffer, further comprising: rasterizing the trim region quads into static per-bucket sorted lists.

15. The method of claim 10, further comprising harvesting the DSB.

16. The method of claim 1, further comprising:
performing, iteratively, for individual scene objects of a plurality of scene objects, the steps of:
generating trim region quads of the individual scene object,
sorting the trim region quads of the individual scene object into buckets,
updating a trim buffer with the trim region of the individual scene object, and
updating a DSB for the individual scene object.

17. The method of claim 16, wherein the step of sorting the trim region quads of the individual scene object into buckets, further comprising:
sorting the trim region quads into screen-space tile locations,
sorting the trim quads by quad depth inside each screen-space tile locations, and
separating the trim region quads into the plurality of buckets, wherein each bucket in the plurality of buckets, contains a maximum number of trim region quads.

18. The method of claim 16, wherein the step of updating a trim buffer with the trim region of the individual scene object, further comprising:
culling trim region fragments that are occluded in the DSB, and
inserting remaining trim region fragments into the trim buffer.

19. The method of claim 16, wherein the step of updating a DSB for the individual scene object, further comprising:
culling object fragments that are contained in the trim buffer, and
inserting remaining object fragments into the DSB.

20. The method of claim 16, further comprising:
harvesting a G-buffer, after performing, iteratively, for individual scene objects of a plurality of scene objects.

21. An apparatus for accelerating occlusion computations, comprising:
a memory configured to store potential visible set (PVS) image information,
a processor configured to:
determine a silhouette edge of an object based on viewpoint information,
generate a trim buffer based on viewport information, including generate a trim region bounded by the silhouette edge,
generate a disoccluded scene buffer (DSB), including (1) determine whether a triangle is within the trim region, and in response to the determination that the triangle is within the trim region, (2) store the triangle as potential visible set (PVS) image information,
sort the trim region quads into screen-space tiles, and
separate the trim region quads into the plurality of buckets, wherein each bucket in the plurality of buckets, contains a maximum number of trim region quads.

22. The apparatus of claim 21, wherein generate a trim buffer based on viewport information, further comprises:
rasterize trim region depth into a trim buffer, and
store fragments in a per-pixel linked list.

23. The apparatus of claim 21, wherein generate a DSB further comprises:
rasterize entire scene of a plurality of triangles into a G-buffer.

24. The apparatus of claim 21, further comprising store back-facing triangles inside the trim region as PVS image information.

25. The apparatus of claim 21, further comprising harvest the DSB.

26. The apparatus of claim 21, wherein the trim region corresponds the viewport and the viewport has a width corresponding to a small location adjustment to the viewpoint information.

27. The apparatus of claim 21, further comprising:
a geometry shader, and
determine a silhouette edge based on viewpoint information and generate a trim region bounded by the silhouette edge is performed by the geometry shader.

28. The apparatus of claim 21, further comprising:
receive the viewpoint information from a client device, and
send the PVS image information to the client device.

29. The apparatus of claim 21, wherein the viewport information is based on the movement of the head of a user of a virtual reality system during rendering delay wherein the rendering delay includes, at least one of the following: transmission of the viewpoint information from the client to the server, and transmission of the PVS image information from the server to the client.

30. The apparatus of claim 21, further comprising:
generate a plurality of trim region quads having a quad depth less than a maximum threshold, and
sort the plurality of trim region quads into a plurality of buckets based on quad depth and quad screen-space tile location.

31. The apparatus of claim 30, wherein sort the plurality of trim region quads into a plurality of buckets based on quad depth and quad screen space-tile location, further comprising:
sort the trim quads by quad depth inside each screen-space tiles.

32. The apparatus of claim 30, further comprising:
generate a trim buffer, and
generate a disoccluded scene buffer (DSB).

33. The apparatus of claim 30, further comprising stream out the trim region quads into GPU global memory.

34. The apparatus of claim 30, wherein the generate a trim buffer, further comprising:
rasterize the trim region quads into static per-bucket sorted lists.

35. The apparatus of claim 30, further comprising, harvest the DSB.

36. The apparatus of claim 21, further comprising:
perform, iteratively, for individual scene objects of a plurality of scene objects, the steps of:
generate trim region quads of the individual scene object,
sort the trim region quads of the individual scene object into buckets,
update a trim buffer with the trim region of the individual scene object, and
update a DSB for the individual scene object.

37. The apparatus of claim 36, wherein sort the trim region quads of the individual scene object into buckets, further comprising:
sort the trim region quads into screen-space tiles,
sort the trim quads by quad depth inside each screen-space tiles, and
separate the trim region quads into the plurality of buckets, wherein each bucket in the plurality of buckets, contains a maximum number of trim region quads.

38. The apparatus of claim 36, wherein update a trim buffer with the trim region of the individual scene object, further comprising:
cull trim region fragments that are occluded in the DSB, and
insert remaining trim region fragments into the trim buffer.

39. The apparatus of claim 36, wherein update a DSB for the individual scene object, further comprising:
cull object fragments that are contained in the trim buffer, and
insert remaining object fragments into the DSB.

40. An apparatus for accelerating occlusion computations, comprising:
a means for determining a silhouette edge of an object based on viewpoint information,
a means for generating a trim buffer based on viewport information, including a means for generating a trim region bounded by the silhouette edge,
a means for generating a disoccluded scene buffer (DSB), including both (1) a means for determining whether a triangle is within the trim region, and in response to determining that the triangle is within the trim region, (2) a means for storing the triangle as potential visible set (PVS) image information,
a means for generating a plurality of trim region quads having a quad depth less than a maximum threshold, and
a means for sorting the plurality of trim region quads into a plurality of buckets based on quad depth.

41. A non-transitory computer-readable medium having stored thereon instructions that when executed by one or more processors cause the one or more processors to:
determine a silhouette edge of an object based on viewpoint information,
generate a trim buffer based on viewport information, including generate a trim region bounded by the silhouette edge,
generate a disoccluded scene buffer (DSB), including (1) determine whether a triangle is within the trim region, and in response to the determination that the triangle is within the trim region, (2) store the triangle as potential visible set (PVS) image information, and
sort the trim region quads into screen-space tiles, and
separate the trim region quads into the plurality of buckets, wherein each bucket in the plurality of buckets, contains a maximum number of trim region quads.

* * * * *